United States Patent
Adhinarayanan et al.

(10) Patent No.: US 12,417,024 B2
(45) Date of Patent: Sep. 16, 2025

(54) TRANSFORMING ALL-BANK PROCESSING-IN-MEMORY OPERATIONS INTO MULTIPLE MASKED PROCESSING-IN-MEMORY OPERATIONS

(71) Applicant: Advanced Micro Devices, Inc., Santa Clara, CA (US)

(72) Inventors: Vignesh Adhinarayanan, Austin, TX (US); Shaizeen Dilawarhusen Aga, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/381,532

(22) Filed: Oct. 18, 2023

(65) Prior Publication Data
US 2025/0130715 A1   Apr. 24, 2025

(51) Int. Cl.
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2021/0373805 A1* | 12/2021 | Alsop | G06F 3/0629 |
| 2023/0195316 A1* | 6/2023 | Park | G06F 1/3275 |
| 2024/0168647 A1* | 5/2024 | Lee | G06F 3/0664 |

\* cited by examiner

*Primary Examiner* — Brian R Peugh
(74) *Attorney, Agent, or Firm* — FIG. 1 Patents

(57) ABSTRACT

A system includes memory hardware including a memory and a processing-in-memory component. A system includes a host including at least one core. A system includes a memory controller including a scheduling system. The scheduling system transforms an all-bank processing-in-memory command into multiple masked processing-in-memory commands. The scheduling system also schedules the multiple masked processing-in-memory commands to the processing-in-memory component.

20 Claims, 16 Drawing Sheets

TRANSFORMING ALL-BANK PROCESSING-IN-MEMORY OPERATIONS INTO MULTIPLE MASKED PROCESSING-IN-MEMORY OPERATIONS

BACKGROUND

Processing-in-memory (PIM) is the integration of computational units, such as processors, accelerators, or custom logic, directly within a memory system. PIM architectures leverage the parallelism and proximity of data processing within the memory system, reducing data movement and improving overall system performance. The computational units perform operations on the data stored within memory cells without requiring data movement to separate processing units, such as a central processing unit (CPU). When a PIM-enabled memory bank receives a memory request, the computational units within the memory chips access and process the data directly from the memory cells. This reduces latency and energy consumption associated with data transfer to external processing units.

DETAILED DESCRIPTION

Overview

Figure 1:
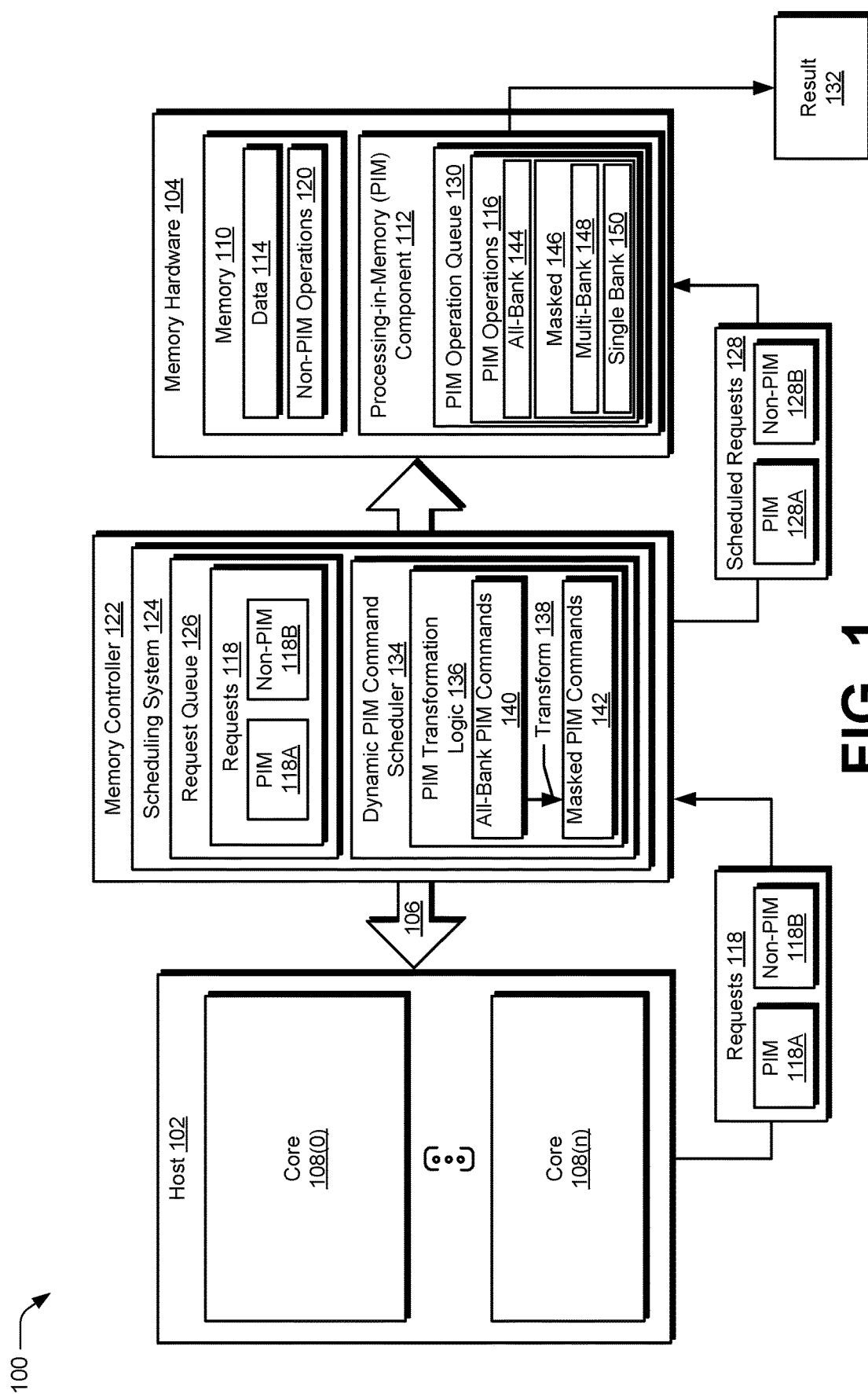
FIG. 1 is a block diagram of a non-limiting example system having a host with at least one core, memory hardware that includes a memory and a processing-in-memory component, and a memory controller that includes a dynamic processing-in-memory scheduler.

PIM architectures exploit the inherent parallelism and data locality of memory systems. Each memory bank independently performs computations on its portion of the data, allowing for concurrent processing across multiple memory banks and exploiting data locality for faster access. PIM architectures also facilitate inter-bank communication or data exchange during computation. Communication channels or buses enable efficient data exchange between memory banks for aggregation and result calculation.

A memory controller and PIM component work together to enable efficient and high-performance memory systems. The memory controller manages memory access and data transfer, while the PIM component leverages computational units within the memory system to process data directly within the memory, reducing data movement and enhancing system performance. The memory controller sends commands to the PIM component instructing the PIM component to perform computational operations.

An all-bank PIM operation is the execution of a computational operation that involves accessing and processing data simultaneously across all memory banks within a memory system. The term all-bank PIM operation, in some scenarios, is directed to all memory banks within a portion of a memory system. In an all-bank PIM operation, input data is distributed across all memory banks within the memory system. The data is partitioned such that each memory bank receives a portion of the input data. This step ensures that the data is evenly spread across the memory banks for parallel processing. Once the data is distributed, the all-bank PIM operation is executed concurrently across all memory banks. Each bank independently processes its portion of the data using the computational units integrated within the memory chips. The computation can involve a range of operations, such as arithmetic, logic, or custom functions, depending on the specific PIM architecture. Once the computation is complete, the results from all the memory banks are collected and combined to obtain the final output of the all-bank PIM operation. This aggregation step involves gathering the processed data from each memory bank and merging the data into a single coherent result. The method of aggregation varies based on the specific application and the nature of the computation.

Memory vendors support all-bank PIM operations in an effort to achieve maximum throughput. However, conventional dynamic random-access memory (DRAM) controllers will execute single memory bank operations, such as per-bank refreshes and high-priority DRAM-only operations (e.g., per-bank row activations, per-bank column accesses, and per-bank precharges). Because of these intervening single memory bank DRAM-only commands, the time in which all memory banks are simultaneously available is shortened. This significantly limits the practical use of all-bank PIM operations.

Per-bank refresh operations limit the amount of time in which all memory banks in a device are available for an all-bank PIM operation to be performed. This is because every row in a DRAM module is configured to be refreshed at least once within a time refresh interval (tREFI), which is usually around 32 milliseconds. For example, in synchronous DRAM (SDRAM) modules with 16 memory banks per memory channel and 32 k rows per memory bank, 128 k per-bank refreshes are scheduled during each time refresh interval, with each time refresh interval refreshing four rows and causing a latency of 206 nanoseconds. Consequently, at least one memory bank is being refreshed in 26.3 milliseconds out of 32 millisecond tREFI (i.e., 82% of the total refresh time). This reduces the amount of time available for all-bank PIM operations to be performed. This issue is exacerbated by higher-density devices, increased stack heights, and increased memory bank counts. On the other hand, adopting all-bank refresh operations on PIM devices creates other issues, such as an increase in the time that an entire DRAM channel is locked and suboptimal PIM operation performance. The techniques disclosed herein improve utilization of PIM devices.

The techniques described herein transform all-bank PIM operations into multiple masked PIM operations (e.g., masked multi-bank operations or a combination of masked multi-bank operations and masked single bank operations) via a dynamic PIM operation scheduler when an intervening per-bank operation, such as per-bank refresh operation or a high priority command, is detected. Moreover, when refresh operations are scheduled between the masked PIM operations, data directly fetched from a local row buffer for use by the PIM component is erased, forcing the dynamic PIM operation scheduler to re-activate a previously opened row. To reduce the frequency of row activation re-issuance, the dynamic PIM operation scheduler also masks memory banks that are expected to undergo a refresh operation before a dependent instruction is scheduled and/or delays per-bank refreshes until both dependent and antecedent PIM operations are scheduled.

In some aspects, the techniques described herein relate to a system including memory hardware including a memory and a processing-in-memory component; a host including at least one core; and a memory controller including a scheduling system to: transform an all-bank processing-in-memory command into multiple masked processing-in-memory commands; and schedule the multiple masked processing-in-memory commands to the processing-in-memory component.

In some aspects, the techniques described herein relate to a system, wherein the scheduling system detects an intervening per-bank command.

In some aspects, the techniques described herein relate to a system, wherein the scheduling system schedules the multiple masked processing-in-memory commands responsive to detecting the intervening per-bank command.

In some aspects, the techniques described herein relate to a system, wherein the intervening per-bank command is a per-bank refresh command.

In some aspects, the techniques described herein relate to a system, wherein the intervening per-bank command is a high priority command.

In some aspects, the techniques described herein relate to a system, wherein the scheduling system determines whether the all-bank processing-in-memory command is to be transformed into the multiple masked processing-in-memory commands based upon one or more conditions.

In some aspects, the techniques described herein relate to a system, wherein the high priority command includes a per-bank row activation command, a per-bank column access command, or a per-bank pre-charge command.

In some aspects, the techniques described herein relate to a system, wherein the scheduling system maintains dependencies among the multiple masked processing-in-memory commands, wherein the multiple masked processing-in-memory commands includes different sets of multi-bank commands.

In some aspects, the techniques described herein relate to a system, wherein the scheduling system avoids re-issuance of an antecedent processing-in-memory command in an antecedent-dependent pair with high priority by delaying a per-bank refresh command.

In some aspects, the techniques described herein relate to a system, wherein the memory is dynamic random-access memory (DRAM), synchronous DRAM (SDRAM), high bandwidth memory (HBM), a ferroelectric RAM (FeRAM), a resistive RAM (RRAM), a spin-transfer torque magnetic RAM (STT-MRAM), or static RAM (SRAM).

In some aspects, the techniques described herein relate to a memory controller including a dynamic processing-in-memory command scheduler to transform an all-bank processing-in-memory command into multiple masked processing-in-memory commands and schedule the multiple masked processing-in-memory commands to a processing-in-memory component.

In some aspects, the techniques described herein relate to a memory controller, wherein the dynamic processing-in-memory command scheduler detects an intervening per-bank command.

In some aspects, the techniques described herein relate to a memory controller, wherein the dynamic processing-in-memory command scheduler schedules the multiple masked processing-in-memory commands responsive to detecting the intervening per-bank command.

In some aspects, the techniques described herein relate to a memory controller, wherein the intervening per-bank command is a per-bank refresh command.

In some aspects, the techniques described herein relate to a memory controller, wherein the intervening per-bank command is a high priority command.

In some aspects, the techniques described herein relate to a memory controller, wherein the high priority command includes a per-bank row activation command, a per-bank column access command, or a per-bank pre-charge command.

In some aspects, the techniques described herein relate to a memory controller, wherein the dynamic processing-in-memory command scheduler maintains dependencies among the multiple masked processing-in-memory commands, wherein the multiple masked processing-in-memory commands includes different sets of multi-bank commands.

In some aspects, the techniques described herein relate to a memory controller, wherein the dynamic processing-in-memory command scheduler avoids re-issuance of an antecedent processing-in-memory command in an antecedent-dependent pair by delaying a per-bank refresh command.

In some aspects, the techniques described herein relate to a method including transforming, by a dynamic processing-in-memory command scheduler of a memory controller, an all-bank processing-in-memory command into multiple masked processing-in-memory commands; and scheduling, by the dynamic processing-in-memory command scheduler of the memory controller, the multiple masked processing-in-memory commands to a processing-in-memory component.

In some aspects, the techniques described herein relate to a method, further including detecting, by the dynamic processing-in-memory command scheduler of the memory controller, an intervening per-bank command; and scheduling, by the dynamic processing-in-memory command scheduler of the memory controller, the multiple masked processing-in-memory commands responsive to detecting the intervening per-bank command.

In some aspects, the techniques described herein relate to a method, further including maintaining, by the dynamic processing-in-memory command scheduler, dependencies among the multiple masked processing-in-memory commands, wherein the multiple masked processing-in-memory commands includes different sets of multi-bank commands.

FIG. 1 is a block diagram of a non-limiting example system 100. The illustrated system 100 includes a host 102 and a memory hardware 104, where the host 102 and the memory hardware 104 are communicatively coupled via a connection/interface 106. In one or more implementations, the host 102 includes at least one core 108. In some implementations, the host 102 includes multiple cores 108. For instance, in the illustrated example, the host 102 is depicted as including core 108(0) and core 108(n), where n represents any integer. The memory hardware 104 includes memory 110 and a PIM component 112.

In accordance with the described techniques, the host 102 and the memory hardware 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that includes one or more cores 108 that perform various operations on and/or using data 114 stored in the memory 110. Examples of the host 102 include, but are not limited to, a central processing unit (CPU), a graphics processing unit (GPU), a field programmable gate array (FPGA), an accelerated processing unit (APU), and a digital signal processor (DSP). For example, in one or more implementations, a core 108 is a processing unit that reads and executes instructions (e.g., of a program), examples of which include to add the data 114, to move the data 114, and to branch the data 114.

In one or more implementations, the memory hardware 104 is a circuit board (e.g., a printed circuit board), on which the memory 110 is mounted and includes the processing-in-memory component 112. In some variations, one or more integrated circuits of the memory 110 are mounted on the circuit board of the memory hardware 104, and the memory hardware 104 includes one or more PIM components 112. Examples of the memory hardware 104 include, but are not limited to, a single in-line memory module (SIMM), a dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In one or more implementations, the memory hardware 104 is a single integrated circuit device that incorporates the memory 110 and the PIM component 112 on a single chip. In some examples, the memory hardware 104 is composed of multiple chips that implement the memory 110 and the PIM component 112 as vertical ("3D") stacks, placed side-by-side on an interposer or substrate, or assembled via a combination of vertical stacking and side-by-side placement.

The memory 110 is a device or system that is used to store information, such as the data 114, for immediate use in a device (e.g., by a core 108 of the host 102 and/or by the PIM component 112). In one or more implementations, the memory 110 corresponds to semiconductor memory where the data 114 is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM) (e.g., single data rate (SDR) SDRAM or double data rate (DDR) SDRAM), ferroelectric RAM (FeRAM), resistive RAM (RRAM), a spin-transfer torque magnetic RAM (STT-MRAM), and static random-access memory (SRAM).

Broadly, the PIM component 112 is a processor and a memory combined on the same chip. The PIM component 112 is configured to process PIM memory operations 116, such as operations performed as part of servicing one or more requests 118 received from the core 108 via the connection/interface 106. The PIM component 112 is representative of a processor with example processing capabilities ranging from relatively simple (e.g., an adding machine) to relatively complex (e.g., a CPU/GPU compute core). In an example, the PIM component 112 processes the requests 118 by executing associated PIM operations 116 using the data 114 stored in the memory 110.

A request 118 encompasses a process of requesting data (e.g., the data 114) from or sending data to the memory hardware 104. The requests 118 are made by a processor or device (e.g., a core 108 of the host 102) to the memory hardware 104 to perform one or more memory operations, such as one or more PIM operations 116 associated with one or more PIM requests 118A and/or one or more non-PIM operations 120 (i.e., conventional memory operations) associated with one or more non-PIM requests 118B.

The requests 118 include information such as a memory address that specifies a location of at least a portion of the data 114 to be accessed within the memory 110, a memory operation type (e.g., read or write operation), and control command(s). For the PIM requests 118A, specifically, the information also includes computation instructions that define the computation to be performed by the PIM component 112 on the data 114 within the memory 110. The techniques described herein improve on various aspects of PIM technologies. As such, the techniques described herein are useable on the PIM requests 118A. In some implementations, the system 100 is configured to process the FIG. 1 PIM requests 118A. In other implementations, the system 100 is configured to process both the PIM requests 118A and the non-PIM requests 118B.

The PIM operations 116 and the non-PIM operations 120 are specific actions performed on the memory hardware 104. The PIM operations 116 are specific actions performed by the PIM component 112, such as actions to implement the computation instructions defined in a PIM request 118A. The non-PIM operations 120 are actions performed on the memory 110, such as reading the data 114 or writing the data 114. The PIM operations 116 significantly improve performance of the system 100 by reducing data movement, minimizing latency, and taking advantage of the parallelism and proximity of data processing within the memory hardware 104. The PIM operations 116 are particularly beneficial for applications with high memory bandwidth requirements, such as data-intensive analytics, machine learning, and scientific simulations.

A memory command is a specific control signal or instruction sent to the memory hardware 104 to perform a particular memory operation, such as a non-PIM operation 120 or a PIM operation 116. A memory command is a low-level command that directly interacts with the memory controller 122 or the memory 110 to initiate a memory operation. Memory commands are often specific to the memory technology being used, such as DDR memory, where commands like READ, WRITE, PRECHARGE, and ACTIVATE are used to control access to the DDR memory. Specific to the PIM component 112 are PIM commands, such as all-bank PIM commands that are issued to all memory banks within the memory 110 simultaneously to initiate a parallel processing operation. An all-bank PIM command is a low-level control signal sent to each individual memory bank within the memory hardware 104 to coordinate the execution of a computational task in the PIM component 112. A per-bank PIM command is a low-level control signal sent to a single memory bank within the memory hardware 104 to coordinate the execution of a computational task in the PIM component 112.

PIM architectures contrast with conventional computer architectures that obtain data from memory, communicate the data to a remote processing unit (e.g., a core 108 of the host 102), and process the data using the remote processing unit (e.g., using a core 108 of the host 102 rather than the PIM component 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., a core 108 of the host 102) is further away from the memory 110 than the PIM component 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the PIM component 112 enables increased computer performance while reducing data transfer energy as compared to conventional computer architectures that implement remote processing hardware. Further, the PIM component 112 alleviates some memory performance and energy bottlenecks by moving one or more memory-intensive computations closer to the memory 110. Although the PIM component 112 is illustrated as being disposed within the memory hardware 104, in some examples, the described benefits of using processing-in-memory techniques are realizable through near-memory processing implementations in which the PIM component 112 is disposed in closer proximity to the memory 110 (e.g., in terms of data communication pathways) than a core 108 of the host 102.

The system 100 is further depicted as including a memory controller 122. The memory controller 122 is configured to receive the requests 118 from the host 102 (e.g., from a core 108 of the host 102). Although depicted in the example system 100 as being implemented separately from the host 102, in some implementations, the memory controller 122 is implemented locally as part of the host 102. The memory controller 122 is further configured to schedule the requests 118 for a plurality of hosts 102, despite being depicted in the illustrated example of FIG. 1 as serving a single host 102. For instance, in an example implementation, the memory controller 122 schedules the requests 118 for a plurality of different hosts 102, where each of the plurality of different hosts 102 include one or more cores 108 that submit the requests 118 to the memory controller 122 for scheduling with the memory hardware 104.

In accordance with one or more implementations, the memory controller 122 is associated with a single channel of the memory 110. For instance, the system 100 is configured to include a plurality of different memory controllers 122, one for each of a plurality of channels of the memory 110. The techniques described herein are thus performable using a plurality of different memory controllers 122 to schedule the requests 118 for different channels of the memory 110. In some implementations, a single channel in the memory 110 is allocated into multiple pseudo-channels. In such implementations, the memory controller 122 is configured to schedule the requests 118 for different pseudo-channels of a single channel in the memory 110.

As depicted in the illustrated example of FIG. 1, the memory controller 122 includes a scheduling system 124. The scheduling system 124 is representative of a digital circuit configured to schedule the requests 118 for execution in a manner that optimizes performance of the system 100 (e.g., limits computational resource consumption, decreases latency, and reduces power consumption of the system 100) when measured over execution of the requests 118. The scheduling system 124 includes a request queue 126. The request queue 126 is configured to maintain a queue of the requests 118 received at the memory controller 122 from the host 102. The illustrated request queue 126 includes both PIM requests 118 and non-PIM requests 118B. In some implementations, the scheduling system 124 includes multiple request queues, such as a PIM request queue for handling PIM requests 118A and a non-PIM request queue for handling non-PIM requests 118B. Alternatively, the memory controller 122 is logically or physically divided into separate memory controllers designed to serve specific types of requests 118, such as a logical or physical memory controller for serving PIM requests 118A and another logical or physical memory controller for serving non-PIM requests 118B. Other variations on this concept are contemplated.

The scheduling system 124 is configured to schedule an order of the requests 118 maintained in the request queue 126 for execution by the PIM component 112 (i.e., PIM requests 118A) and/or the host 102 (i.e., non-PIM requests 118B). As depicted in the illustrated example of FIG. 1, the requests 118 selected by the scheduling system 124 from the request queue 126 are represented as scheduled requests 128. Specifically, the requests 118 selected by the scheduling system 124 from the request queue 126 for execution by the PIM component 112 are represented as PIM scheduled requests 128A, and the requests 118 selected by the scheduling system 124 for execution by the host 102 are represented as one or more scheduled non-PIM requests 128B. In some implementations, the scheduling system 124 selects a single request 118 from the request queue 126 for inclusion in the scheduled requests 128 per clock cycle of the system 100. Alternatively, the scheduling system 124 selects multiple requests 118 from the request queue 126 for inclusion in the scheduled requests 128 per clock cycle.

The scheduled PIM requests 128A are transmitted by the memory controller 122 to a PIM operation queue 130 of the PIM component 112. The PIM operation queue 130 is representative of a data storage structure in the PIM component 112 that maintains an ordered list of operations, such as the PIM operations 116, scheduled for execution by the PIM component 112 using, at least in part, the data 114 stored in the memory 110. As part of executing a scheduled PIM request 128A, the PIM component 112 executes the appropriate PIM operations 116 and generates a result 132 that includes results data generated from processing the data 114 stored in the memory 110.

Instructions included in a scheduled PIM request 128A for outputting the result 132 are configurable. For instance, in some implementations, executing a scheduled PIM request 128A causes the PIM component 112 to communicate the result 132 to a requesting source, such as the host 102. Alternatively, or additionally, in some implementations, instructions included in the scheduled PIM request 128A cause the PIM component 112 to output the result 132 to a storage location in the memory 110 (e.g., to update the data 114 stored in the memory 110 for subsequent access and/or retrieval by the host 102, and so forth). Alternatively, or additionally, in some implementations, instructions included in the scheduled PIM request 128A cause the PIM component 112 to store the result 132 locally (e.g., in a register of the PIM component 112).

Because the PIM component 112 executes the scheduled PIM requests 128A on behalf of the host 102, the PIM component 112 is configured to execute the scheduled PIM requests 128A with minimal impact on the system 100 (e.g., without invalidating caches of the system 100 or causing traffic on the connection/interface 106). For instance, the PIM component 112 executes the scheduled PIM requests 128A on the memory 110 "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the PIM component 112 is closer to the memory 110 than the core 108 of the host 102 in terms of data communication pathways, evaluating the data 114 stored in the memory 110 is generally completable in a shorter amount of time using the PIM component 112 than if the evaluation were performed using the core 108 of the host 102.

The illustrated scheduling system 124 also includes a dynamic PIM command scheduler 134 that includes PIM transformation logic 136. The PIM transformation logic 136 performs a transformation process (shown generally as "transform 138") all-bank PIM commands 140 into multiple masked PIM commands 142. In one or more implementations, the transform 138 is triggered by per-bank commands, such as a per-bank refresh command (REFpb) or other intervening per-bank commands as will be described in further detail herein. Examples of other intervening per-bank commands include high priority commands such as, but not limited to, a per-bank row activation command, a per-bank column access command, and a per-bank precharge command. In other implementations, other triggers cause the transform 138 to be performed.

The memory controller 122 generates the all-bank PIM commands 140 to coordinate execution of all-bank PIM operations 144 (e.g., as part of the PIM operations) by the PIM component 112. An all-bank PIM command 140 is the instruction issued to initiate a parallel processing operation across all memory banks of the memory 110 simultaneously. In some implementations, the all-bank PIM command 140 is issue to initiate a parallel processing operation across all memory banks of a portion of the memory 110. The all-bank PIM command 140 specifies the computation to be performed and is sent from the memory controller 122 to the PIM component 112. An all-bank PIM operation 144 refers to the actual execution of the computation across the memory banks of the memory 110, with each memory bank independently performing the operation on its portion of the data 114. An all-bank PIM operation 144 is coordinated by an all-bank PIM command 140 and leverages the computational units within each memory bank.

The transform 138 divides the all-bank PIM commands 140 into multiple masked PIM commands 142. A masked PIM command 142 is the instruction issued to initiate an operation across one set of one or more memory banks of the memory 110 while masking one or more operations performed at another set of one or more memory banks of the memory 110. The masked PIM command 142 specifies the computation to be performed and is sent from the memory control 122 to the PIM component 112. A masked PIM operation 146 refers to the actual execution of the computation across one set of one or more memory banks of the memory 110 that masks one or more operations performed at another set of one or more memory banks of the memory 110. A masked PIM operation 146 is coordinated by a masked PIM command 142 and leverages the computational units within the corresponding memory bank(s).

In one or more implementations, the PIM transformation logic 136 executes the transform 138 to divide an all-bank PIM command 140 into multiple masked PIM commands 142. In some implementations, the masked PIM commands 142 created by the transform 138 are masked multi-bank PIM commands that cause the PIM component 112 to execute masked multi-bank PIM operations 148. In other implementations, the masked PIM commands 142 created by the transform 138 are a combination of masked single bank PIM commands and masked multi-bank PIM commands that cause the PIM component 112 to execute one or more masked single bank PIM operations 150 and one or more masked multi-bank PIM operations 148. Additional details in this regard will be described herein below.

Figure 2:
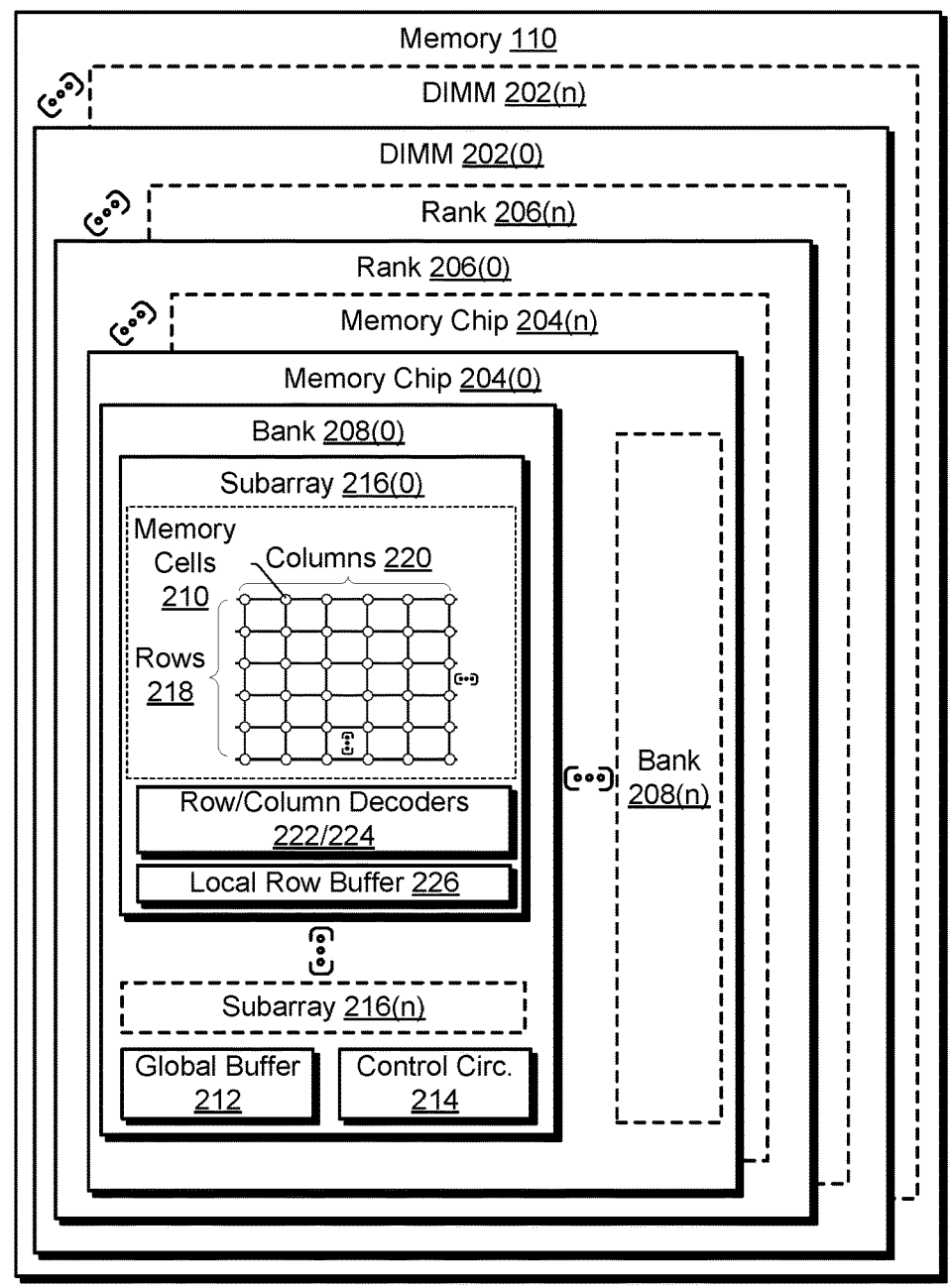
FIG. 2 is a block diagram of a non-limiting example memory architecture for a memory.

FIG. 2 depicts a non-limiting example memory architecture 200 for the memory 110. The illustrated memory architecture 200 includes one or more DIMMs 202(0)-202(n). Each DIMM 202 is a circuit board that contains one or more memory chips 204(0)-204(n) organized into one or more ranks 206(0)-206(n). A DIMM 202 is a physical module that is inserted into a memory slot on a circuit board, such as motherboard. A DIMM 202 provides a way to expand the memory capacity of a computer system, such as the system 100. A rank 206 is a logical group of memory chips 204 on a DIMM 202. Each rank 206 has a set of memory chips 204 and operates independently of the other ranks 206 on the same DIMM 202. A memory chip 204, also known as a memory module or memory die, is a component that stores data, such as the data 114, in binary form.

Each memory chip 204 includes one or more memory banks (shown as "banks") 208(0)-208(n). A bank 208 is a subset of memory cells 210 within a memory chip 204. A bank 208 is the smallest unit that is accessed independently within a memory chip 204. Each bank 208 has a global buffer 212 and control circuitry 214. The global buffer 212 is shared among multiple memory cells 210 or multiple subarrays 216(0)-216(n). The global buffer 212 provides a temporary storage location for data (e.g., the data 114) being read from or written to the memory cells 210. The global buffer 212 facilitates efficient data transfer and helps manage data flow within a memory bank 208.

Each subarray 216 is a smaller partition within a bank 208. A subarray 216 includes a set of rows 218 and columns 220 of the memory cells 210. Each subarray 216 has a row decoder 222, a column decoder 224, sense amplifiers (not shown), and a local row buffer 226. The division of a bank 208 into subarrays 216 allows for parallelism in accessing and retrieving data (e.g., the data 114) from the memory 110.

The primary function of a row decoder 222 is to decode a memory address provided by the memory controller 122 and activate the appropriate row 218 of memory cells 210 in response. The memory address typically includes a row address and a column address. The row decoder 222 focuses on decoding the row address. The row decoder 222 receives the row address bits from the memory controller 122 as input. The number of row address bits depends on the memory organization and the size of the memory array. The row decoder 222 determines which row 218 of memory cells 210 to activate based on these address bits. Once the row address bits are received, the row decoder 222 performs various logical operations, such as decoding and demultiplexing, to identify the specific row to be activated. This involves activating a set of select lines that correspond to the desired row. The select lines generated by the row decoder 222 are then fed into the wordline driver circuitry (e.g., part of the control circuitry 214 of the bank 208 or dedicated circuitry within the subarray 216), which activates the wordline associated with the selected row. The wordline connects to the gates of the memory cells 210 in the activated row, enabling read or write operations. When the wordline associated with the selected row is activated, the wordline enables the memory cells 210 within that row to be accessed. The data stored in the cells 210 is read or written depending on the command issued by the memory controller 122. It should be noted that the row decoder 222 operates in conjunction with other memory control circuitry, such as the column decoder 224 and sense amplifiers, to complete memory read or write operations effectively.

The main function of a column decoder 224 is to decode the memory address provided by the memory controller 122 and activate the appropriate column of memory cells 210 in response. The memory address typically consists of a row address and a column address, with the column decoder 224 focusing on decoding the column address. The column decoder 224 receives the column address bits from the memory controller 122 as input. The number of column address bits depends on the memory organization and the size of the memory array. The column decoder 224 determines which column 220 of memory cells 210 to activate based on these address bits. Once the column address bits are received, the column decoder 224 performs various logical operations, such as decoding and demultiplexing, to identify the specific column to be activated. This involves activating a set of select lines that correspond to the desired column 220. The select lines generated by the column decoder 224 are then used to enable the appropriate sense amplifiers in the memory array. Sense amplifiers are used to read and amplify the weak signals from memory cells 210 during read operations or prepare data for write operations. Once the sense amplifiers are activated, the selected column 220 of memory cells 210 are accessed for read or write operations. During a read operation, the data in the selected column 220 is retrieved from the memory cells 210 and forwarded to the memory controller 122 for further processing. In a write operation, the column decoder 224 enables the data from the memory controller 122 to be written into the selected column 220 of memory cells 210. The column decoder 224 works in conjunction with other memory control circuits, such as the row decoder 222 and sense amplifiers, to complete memory read or write operations effectively.

The local row buffer 226, also known as a row buffer or page buffer, is a small, fast access memory storage element located within a memory subarray 216 (as shown) or a bank 208. The local row buffer 226 is a temporary storage space used to hold a row of data that has been accessed from the main memory array. The local row buffer 226 enhances the performance of the memory 110 by reducing the latency associated with accessing data from a memory array. By temporarily storing an entire row of data in the local row buffer 226, subsequent read or write operations within that row are performed more quickly without the need to access the main memory array.

When a row 218 of memory cells 210 is selected for access using the row decoder 222, the corresponding row's data (e.g., a portion of the data 114) is fetched and loaded into the local row buffer 226. The data 114 is transferred from the memory cells 210 to the local row buffer 226 through bitlines and sense amplifiers. The local row buffer 226 consists of a set of storage elements that hold multiple bits of data 114, typically organized as a multi-bit-wide bus. Each storage element corresponds to a memory cell 210 in the selected row 218. The local row buffer 226 temporarily stores the entire row 218 of data 114, ensuring fast access to any data 114 within that row 218. Once the data 114 is stored in the local row buffer 226, subsequent read or write operations within the same row 218 are performed quickly. Instead of accessing the subarray 216, the data 114 is directly accessed from or written to the local row buffer 226. This significantly reduces the access latency since the data 114 is readily available in a high-speed storage element.

After the completion of the operations within the local row buffer 226, the row 218 is deactivated, and the local row buffer 226 is precharged. Precharging involves resetting the bitlines and sense amplifiers, preparing these elements for the next row activation. The local row buffer 226 is then ready to hold a different row of data when the next row is accessed. By utilizing a local row buffer 226, the memory 110 exploits the principle of locality and reduces the time used for accessing data within a row. The local row buffer 226 minimizes the number of accesses to the slower subarrays 216 and provides faster access to frequently accessed data, improving overall memory performance.

Figure 3:
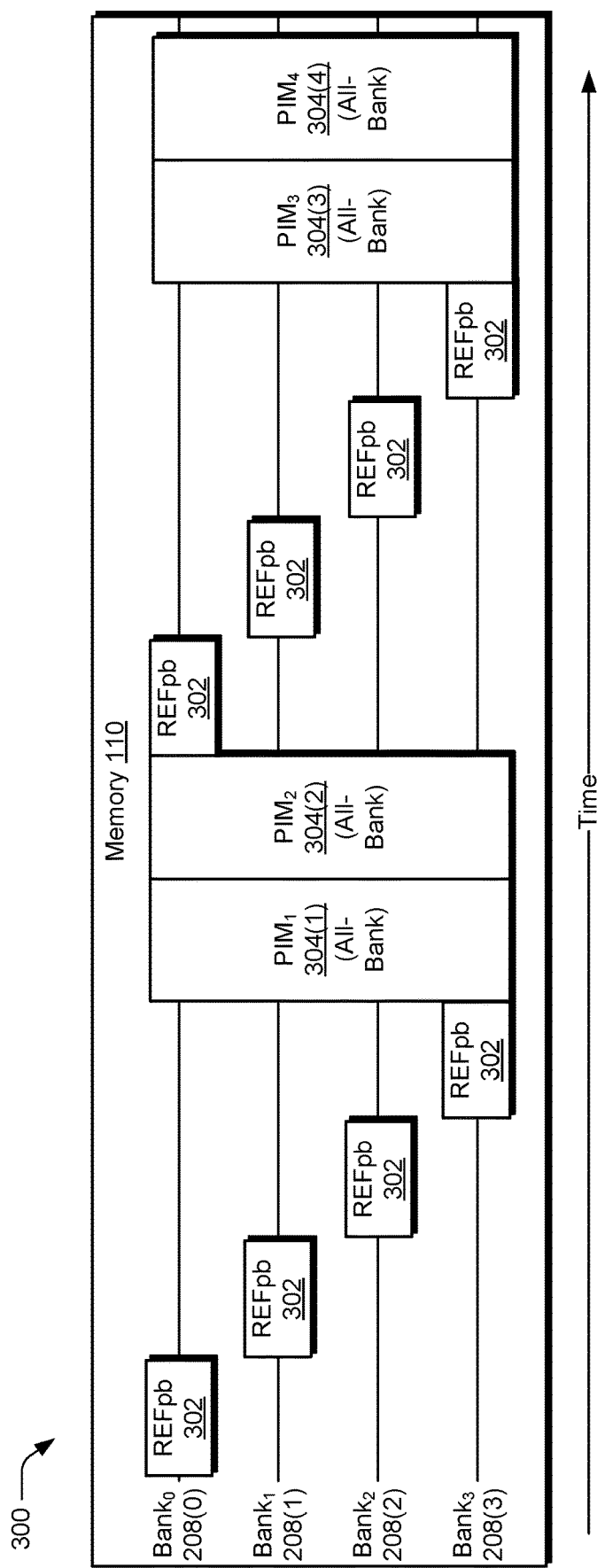
FIG. 3 depicts a current operation execution timeline for all-bank processing-in-memory operations.

FIG. 3 depicts a current operation execution timeline 300 for all-bank PIM operations. The current operation execution timeline 300 shows a plurality of memory banks 208 (0)-208(3) of the memory 110. Currently, each one of these memory banks 208 is refreshed prior to executing an all-bank PIM operation. These memory banks 208 each perform a REFpb operation 302 (shown as REFpb) responsive to REFpb commands received from the memory controller 122. Accordingly, REFpb operations 302 limit the amount of time in which all memory banks in a memory are available for an all-bank PIM operation 304 to be executed. A REFpb command is issued by the memory controller 122 to instruct the memory 110 to refresh each memory bank 208. In DRAM technology, a memory refresh procedure is used to maintain the integrity of stored data. DRAM memory cells are periodically refreshed to compensate for the charge leakage that naturally occurs over time. In a REFpb operation, each memory bank performs a refresh operation independently of the other memory banks. Instead of refreshing an entire memory array simultaneously, each memory bank executes a REFpb operation based on its own internal timing and control circuitry. This allows for distributed refresh operations across multiple banks, reducing the impact on overall system performance. Each memory bank has a refresh counter or timer that tracks the elapsed time since the last refresh operation. When the counter reaches a predefined threshold, indicating the need for a refresh, the memory bank initiates a refresh cycle independently. The timing of the refresh cycles within each memory bank is determined by the internal refresh circuitry. The bank-specific refresh counter ensures that each memory bank performs refresh operations at regular intervals to prevent data corruption. In memory systems with multiple memory banks, REFpb operations allow for parallelism as different banks perform refresh operations simultaneously. This distributed approach helps mitigate the impact of refresh cycles on overall memory access performance. While each memory bank executes its refresh operation independently, coordination or synchronization mechanisms are used to ensure that refresh cycles across banks are staggered and do not coincide. This prevents excessive power draw or performance degradation due to simultaneous refresh operations. By performing refresh operations on a per-bank basis, REFpb operations help maintain the data integrity of each memory bank within a memory system while minimizing the impact on overall system performance.

In the illustrated example, the operation execution timeline 300 shows one REFpb operation 302 being executed for each bank 208(0)-208(3) in the memory 110 prior to execution of all-bank PIM operations 304(1), 304(2) followed by another round of REFpb operations 302 before additional all-bank PIM operations 304(3), 304(4) are executed. This is because every row in a DRAM module is refreshed at least once within a tREFI period, which is currently around 32 milliseconds. In HBM3E stacks with 16 memory banks per channel and 32 k rows per-bank, 128 k REFpb operations are scheduled during each tREFI period. Each REFpb operation 304 refreshes four rows and causes a latency of around 206 nanoseconds. Consequently, at least one memory bank undergoes a refresh in approximately 26.3 milliseconds out of every 32 millisecond tREFI period (i.e., 82% of the total time). This reduces the amount of time available for all-bank PIM operations 304 to be executed.

The above issue is exacerbated by higher-density devices, stack height, or bank count. On the other hand, adopting all-bank refresh (REFab) operations on PIM devices creates at least two new problems. REFab operations increase the duration for which an entire DRAM channel is locked, impacting the performance of non-PIM DRAM operations (e.g., the non-PIM operations 120). REFab operations also lead to suboptimal PIM operation performance compared to the disclosed techniques. More particularly, the disclosed techniques enhance PIM throughput when REFpb operations 302, and more generically, any intervening per-bank operation is executed.

Over the years, physical implementations of PIM devices have emerged, but the REFpb operation is a recent addition that did not exist in earlier PIM devices. Therefore, optimizing PIM throughput while considering the limitations imposed by REFpb operations is not well-studied. A potential solution to the problems highlighted above is issuing single bank PIM operations, which provides additional scheduling flexibility around REFpb and per-bank refresh management (RFM) operations. However, this solution imposes additional pressure on the CA pins and does not attain the memory bandwidth boost provided by PIM technology. The techniques described herein optimize PIM operation throughput by addressing the aforementioned limitations of REFpb operations, specifically, the limited availability of all banks simultaneously for PIM operations.

Figure 4:
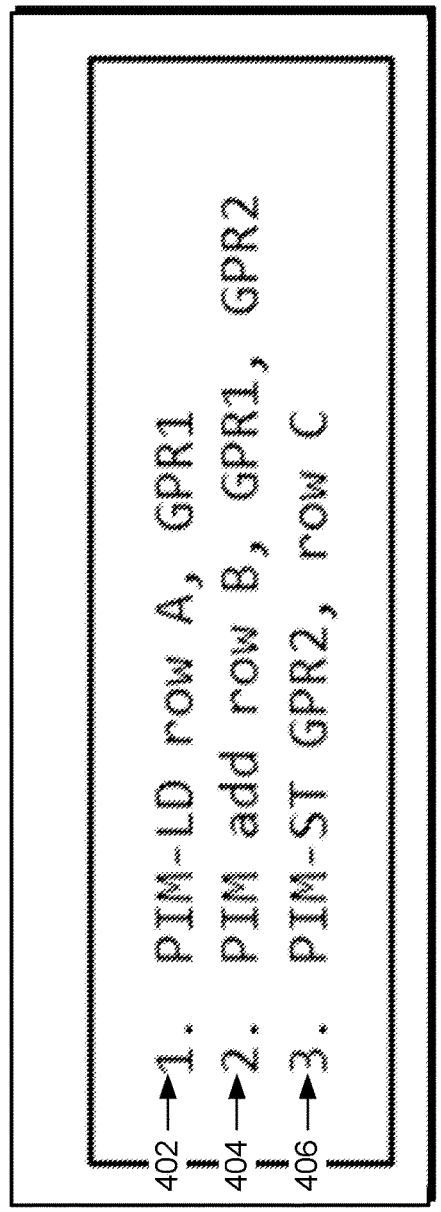
FIG. 4 depicts a code snippet as a non-limiting example of performing vector addition through processing-in-memory operations.

FIG. 4 depicts a pseudo-code snippet 400 as an example of performing vector addition using PIM operations 116. In this example, the memory controller 122 sends a sequence of four all-bank PIM commands 140 to complete all-bank PIM operations 144 to execute a vector addition. Instruction #1 402 loads the contents of row A into a first general-purpose register (shown as "GPR1"). Instruction #2 404 causes the contents of row B to move into the local row buffer 226 typically via an ACT command. Furthermore, instruction #2 402 adds the contents of the local row buffer 226 with the contents of GPR 1 and stores the results in a second GPR (shown as "GPR2"). Instruction #3 406 writes the output of the vector addition (now stored in GPR2) to row C. During execution of these instructions 402, 404, 406, the memory controller 122 schedules REFpb operations 302 to be executed by each memory bank 208 to retain the correct values in the memory cells 210.

In a normal sequence of operations, the memory controller 122 schedules the first all-bank PIM operation 304(1) in the cycle following the completion of the REFpb operation 304 in the last memory bank 208(3), as shown in the example illustrated in FIG. 3. In FIG. 3, the memory controller 122 waits until the last REFpb operation 302 is executed before issuing an all-bank PIM command 140 for the PIM component 112 to execute an all-bank PIM operation 304. Advantageously, in accordance with the techniques described herein, the memory controller 122 no longer waits for the last REFpb operation 302 to be executed before issuing an all-bank PIM command 140 for the PIM component 112 to execute an all-bank PIM operation 304. Instead, the dynamic PIM command scheduler 134 detects a REFpb operation 302 and transforms, via the PIM transformation logic 136, an all-bank PIM command 140 into multiple masked PIM commands 142. This technique is further described with reference to FIG. 5.

Figure 5:
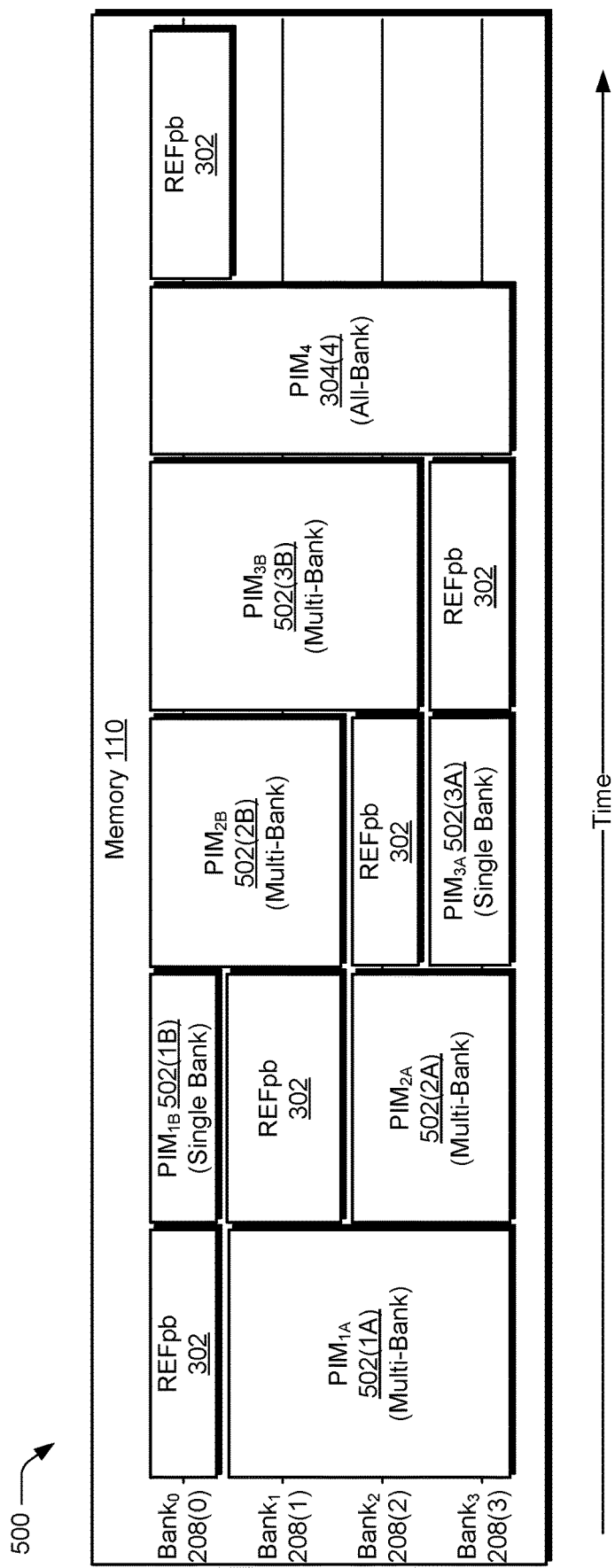
FIG. 5 depicts a non-limiting example operation execution timeline for masked multi-bank operations.

FIG. 5 depicts a non-limiting example operation execution timeline 500 for executing masked PIM operations 146. The illustrated operation execution timeline 500 includes four memory banks 208(0)-208(3), the same as in FIG. 3. However, upon detecting a REFpb operation 302 at the first memory bank (shown as "bank$_0$ 208(0)" in FIG. 3 and FIG. 5), instead of allowing additional REFpb operations 302 to be executed by the other memory banks (shown as "bank$_1$ 208(1), bank$_2$ 208(2), and bank$_3$ 208(3)" in FIG. 3 and FIG. 5) before executing the first all-bank PIM operation 304(1), as depicted in FIG. 3, the techniques disclosed herein enable the dynamic PIM command scheduler 134, via the PIM transformation logic 136, to transform 138 the all-bank PIM command 140 (i.e., the command instructing the PIM component 112 to execute the first all-bank PIM operation 304(1)) into multiple masked PIM commands 142. In the illustrated example, the first all-bank PIM operation 304(1) from FIG. 3 is divided into two masked PIM operations 146, including a masked multi-bank PIM operation 502(1A) and a masked single bank PIM operation 502(1B). The masked multi-bank PIM operation 502(1A) masks banks$_{1-3}$ 208(1)-208(3). The masked single bank PIM operation 502(1B) masks bank$_0$ 208(0) that is undergoing the REFpb operation 302.

Typically, the memory banks 208 that are neither executing the second all-bank PIM operation 304(2) (shown in FIG. 3) nor refreshing during this time period are inactive. To better utilize these idle memory banks 208, the dynamic PIM command scheduler 134 transforms a second all-bank PIM command 140 for the second all-bank PIM operation 304(2) in FIG. 3 into two more masked PIM commands 142 to instruct the PIM component 112 to execute two more masked PIM operations 146, including masked multi-bank PIM operations 502(2A), 502(2B) as shown. By commanding the PIM component 112 to execute the multi-bank PIM operation 502(2B), the dynamic PIM command scheduler 134 masks bank$_1$ 208(1) (which is refreshing) and bank$_0$ 208(0) (which is executing the masked single bank PIM operation 202(1B)). By commanding the PIM component 112 to execute the multi-bank PIM operation 502(2A), the dynamic PIM command scheduler 134 masks bank$_2$ 208(2) and bank$_3$ 208(3).

When there is a dependency between PIM operations, the dynamic PIM command scheduler 134 delays issuing the masked PIM commands 142. For example, in FIG. 3, the fourth all-bank PIM operation 304(4) depends on the output of the third all-bank PIM operation 304(3). In this case, all masked PIM commands 142 related to the execution of the fourth all-bank PIM operation 304(4) are delayed until all masked PIM commands 142 related to the third all-bank PIM operation 304(3) are completed.

Figure 6:
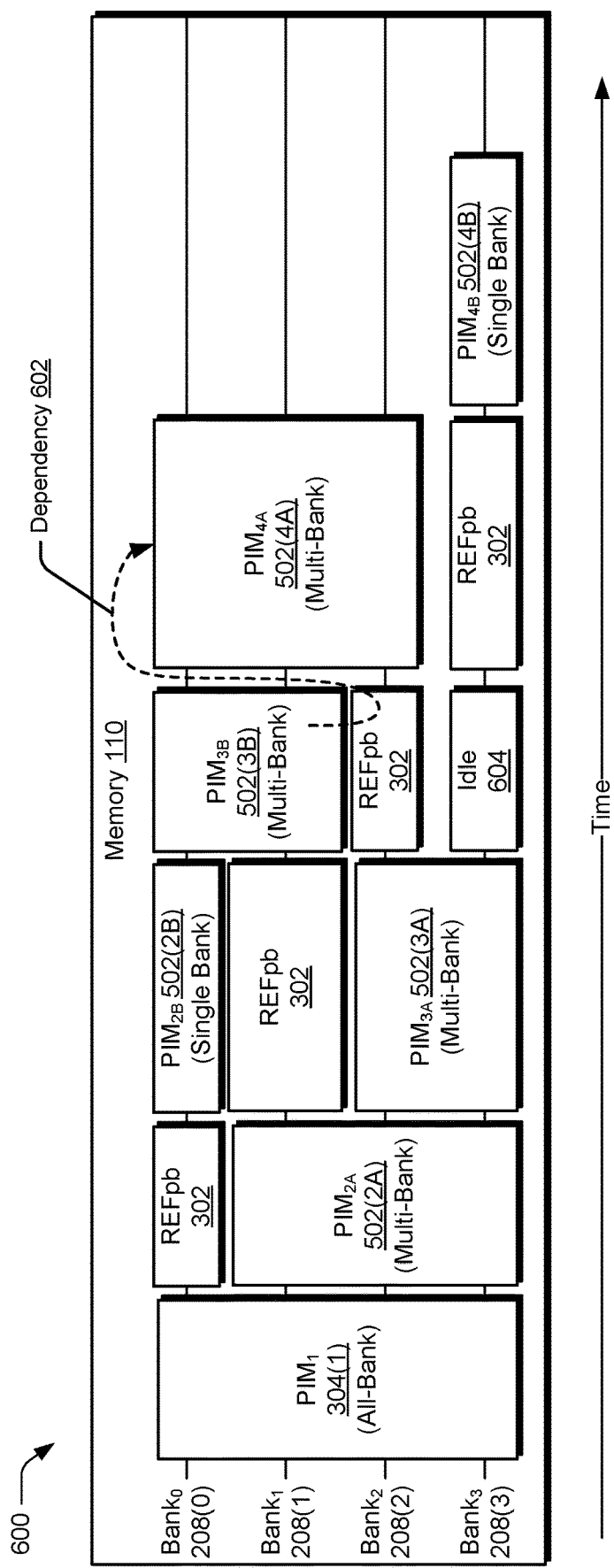
FIG. 6 depicts a non-limiting example operation execution timeline for delaying multi-bank processing-in-memory operations based upon dependencies.

FIG. 6 depicts a non-limiting example operation execution timeline 600 for delaying execution of masked PIM operations 146 based upon dependencies. In the illustrated example, to detect a dependency 602 and delay issuance of both masked PIM operations 146, including masked multi-bank PIM operation 502(4A) and single bank PIM operation 502(4B) (both corresponding to the fourth all-bank PIM operation 304(4) in FIG. 3), the dynamic PIM command scheduler 134 modifies the standard read-after-write (RAW) and write-after-write (WAW) detection support of the memory controller 122 for PIM operations. The fourth all-bank PIM operation 304(4) is detected as a read/write operation, and the third all-bank PIM operation 304(3) is detected as a write operation to the same address/register. In normal operation with RAW/WAW detection support enabled, the fourth all-bank PIM operation 304(4) is delayed after the third all-bank PIM operation 304(3). In the techniques described herein, RAW/WAW detection support is modified such that the fourth all-bank PIM operation 304(4) is delayed until after the third multi-bank PIM operation 502(3A), 502(3B) (i.e., the RAW/WAW spans multiple commands/operations).

In all the examples above, the fact that scheduling a refresh command to a memory bank erases the contents of the corresponding local row buffer has not been considered. To illustrate this point further, the sequence of instructions presented in FIG. 4 are broken down into further instructions presented in FIG. 7.

Figure 7:
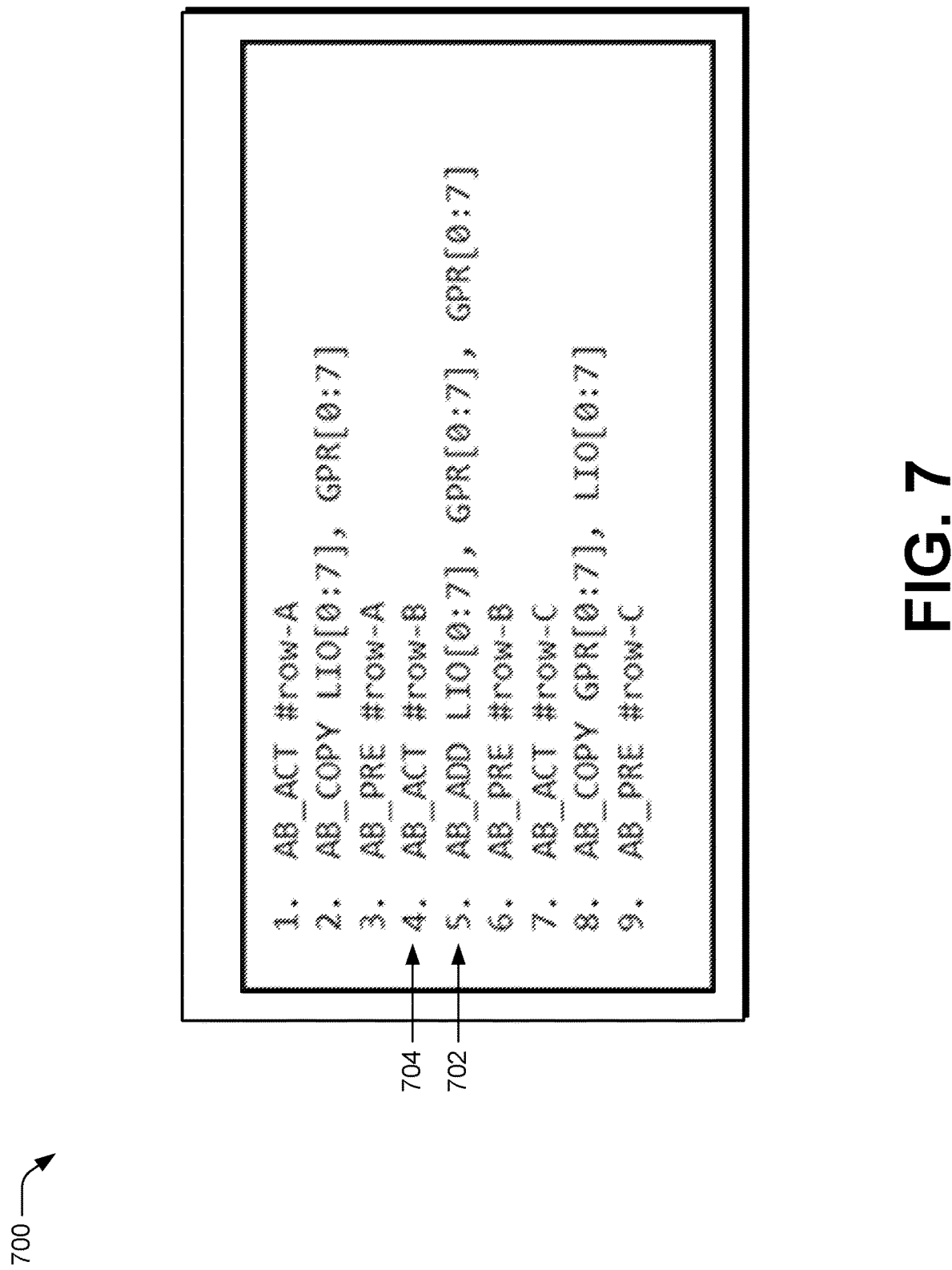
FIG. 7 depicts a detailed code snippet as a more detailed non-limiting example for the code snippet depicted in FIG. 4.

FIG. 7 depicts a detailed code snippet 700 as a more detailed non-limiting example code corresponding to the pseudo-code snippet 400 depicted in FIG. 4. It should be noted that the numbering scheme of the instructions shown in the detailed code snippet 700 does not coincide with the numbering scheme of the instructions shown in the pseud-code snippet 400. For example, instruction #4 in FIG. 7 does not follow instruction #3 in FIG. 4. In instruction #5 in FIG. 7(702), the contents of row B are read directly from the local row buffer (shown as "LIO") to reduce usage of the GPRs. If a REFpb operation to any one of the memory banks gets scheduled between instruction #4 (704) and instruction #5 (702), instruction #4 (704) is re-issued.

The dynamic PIM command scheduler 134 is also designed to optimize performance by issuing a masked PIM command 142 with high priority to regenerate an erased value. This scenario is described with reference to FIG. 8.

Figure 8:
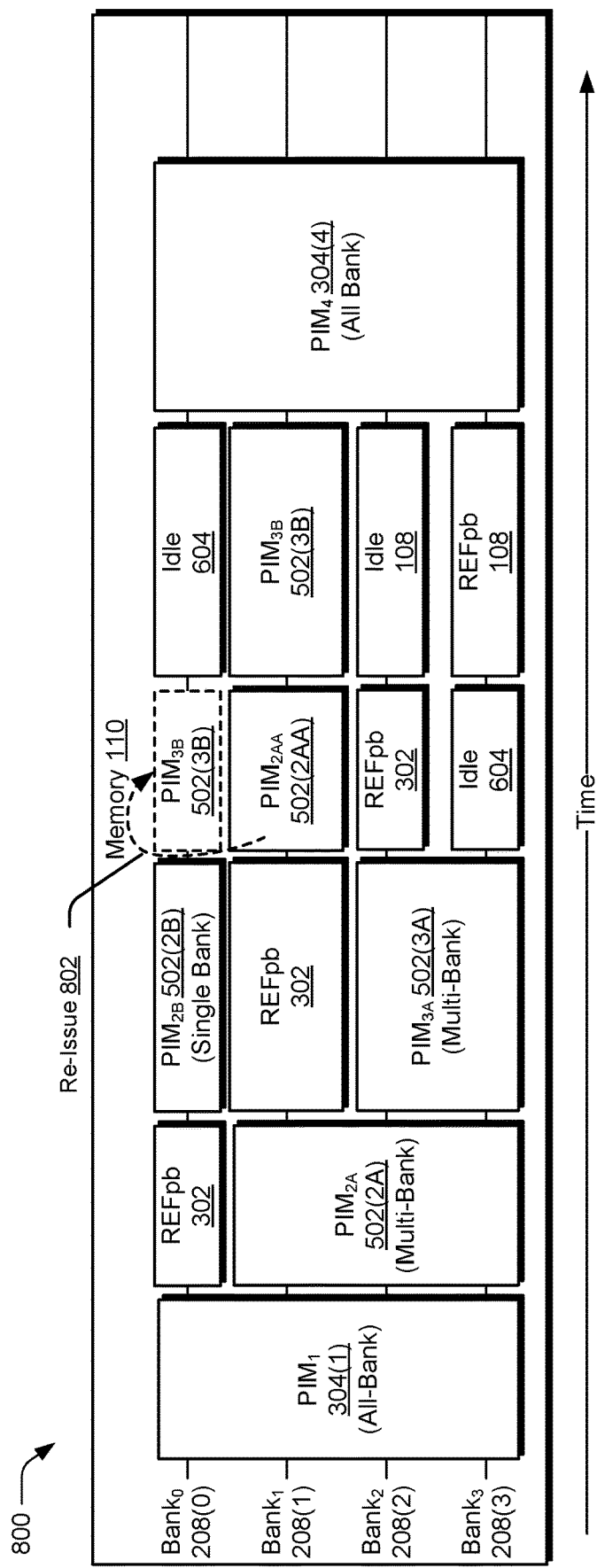
FIG. 8 depicts a non-limiting example operation execution timeline for re-issuing instructions with high priority to regenerate erased values.

FIG. 8 depicts a non-limiting example operation execution timeline 800 for re-issuing instructions with high priority to regenerate erased values. In the illustrated example, a re-issue operation 802 takes place when a REFpb command is issued and the dynamic PIM command scheduler 134 detects that a dependent instruction has not been scheduled for the memory bank 208 that is undergoing a refresh. In particular, the masked single bank PIM operation 502 (2AA) is re-issued via the re-issue operation 802 with higher priority over masked single bank PIM operation 502(3B) to generate an erased value on the local row buffer 226 (LIO in FIG. 7). Note that the dynamic PIM command scheduler 134 eventually switches back to all-bank PIM operations 144 when there are no more intervening single bank operations. In this manner, maximum throughput is achieved.

Figure 9:
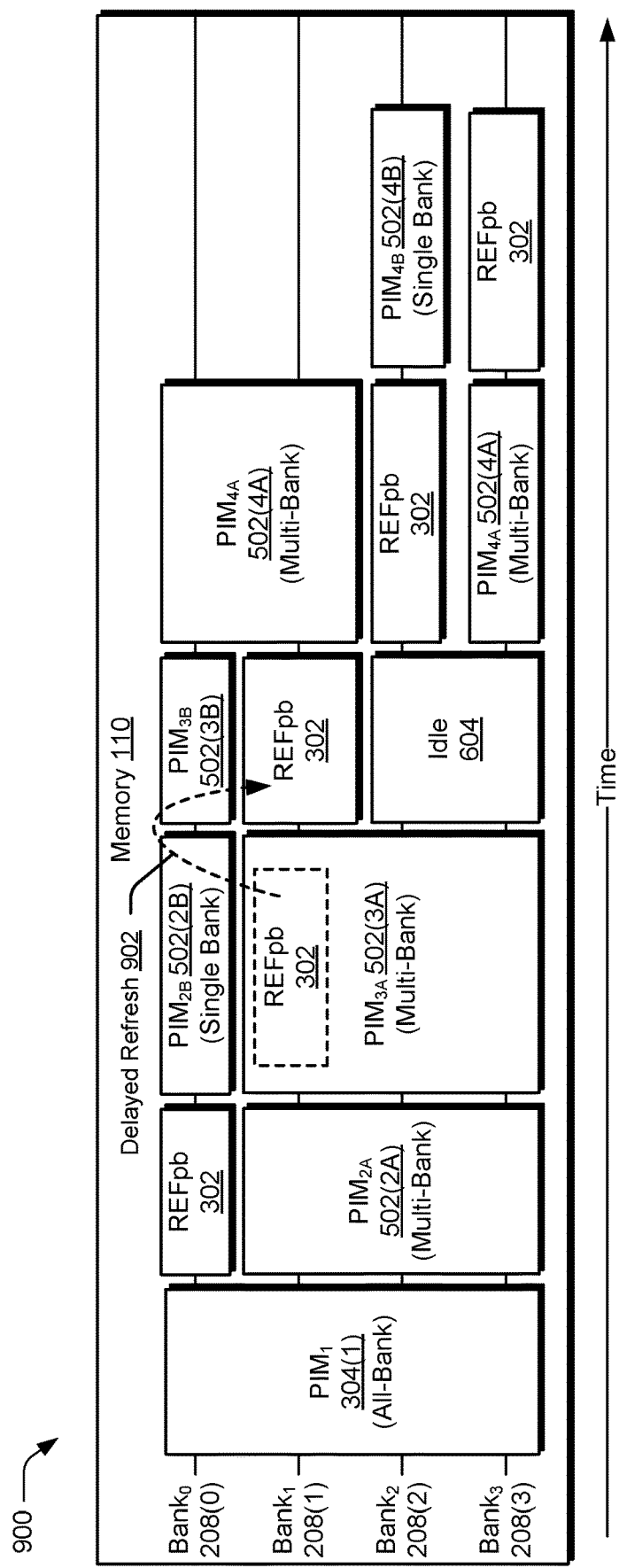
FIG. 9 depicts a non-limiting example operation execution timeline for delaying per-bank refreshes until both antecedent and dependent processing-in-memory operations are executed completely.

FIG. 9 depicts a non-limiting example operation execution timeline 900 for delaying REFpb operations until both antecedent and dependent PIM operations are executed completely. In one or more implementations, to further optimize performance, the dynamic PIM command scheduler 134 delays a REFpb command when there are both antecedent and dependent PIM commands to be scheduled. This delay occurs until both corresponding operations are fully executed. In the illustrated example, the dynamic PIM command scheduler 134 delays (shown as "delayed refresh 902") a REFpb operation 302 between the masked single bank PIM operation 502(2B) and the masked multi-bank PIM operation 502(3A). This is because the masked multi-bank PIM operation 502(3A) depends upon the masked single bank PIM operation 502(2B). Furthermore, the masked single bank PIM operation 502(3B), without the delayed refresh 902, would be split off from antecedent masked multi-bank PIM operation 502(3A).

Figure 10:
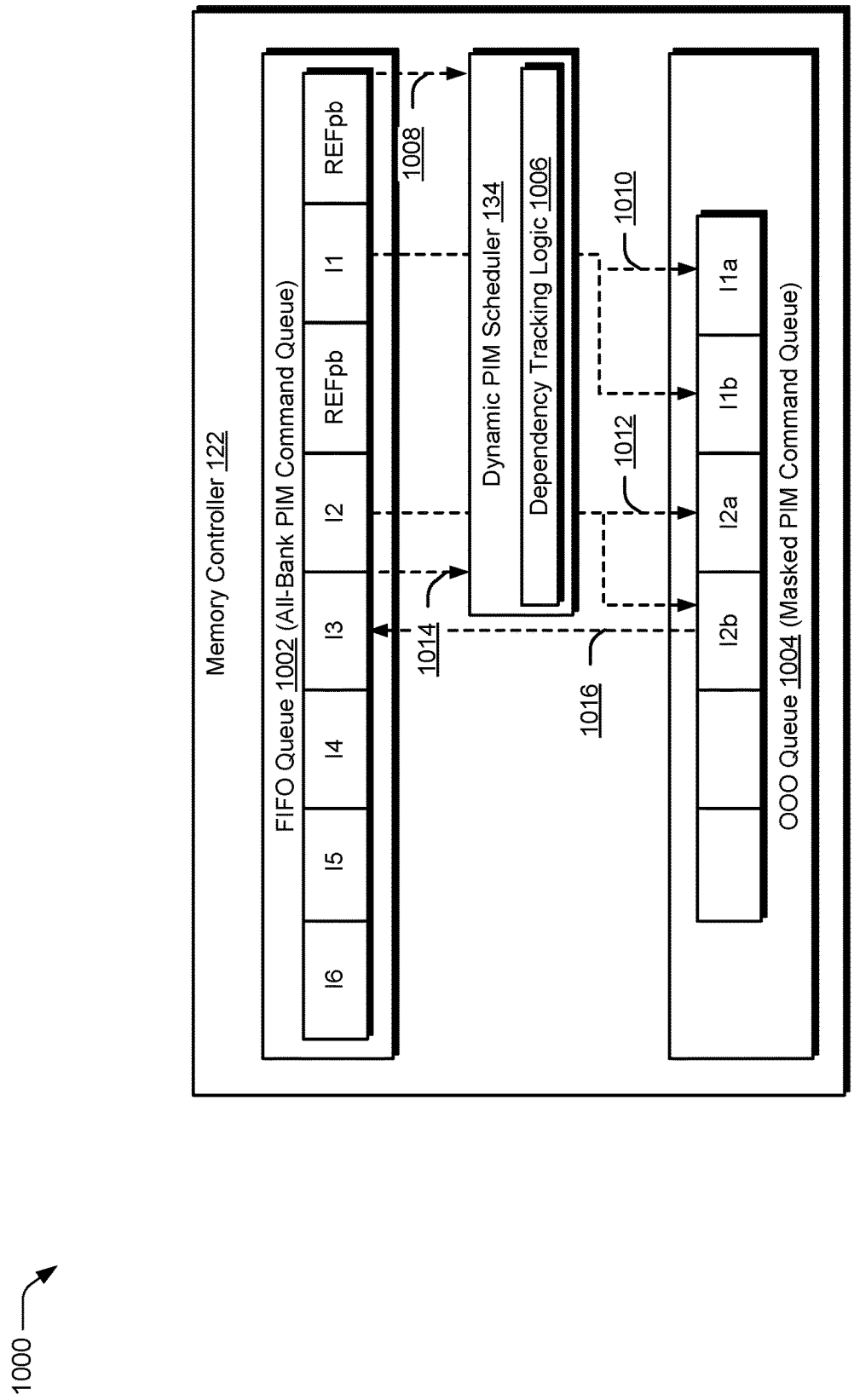
FIG. 10 is a block diagram of a non-limiting example of an alternative memory controller configuration.

FIG. 10 is a block diagram of a non-limiting example of an alternative memory controller configuration 1000 of the memory controller 122. Typically, a PIM command queue at the memory controller 122 is drained in first-in-first-out (FIFO) order. With the techniques disclosed herein, dependencies across instructions are tracked when an all-bank PIM command 140 is broken down into multiple masked PIM commands 142. Thus, in the alternative memory controller configuration 1000, this functionality is implemented with the addition of a smaller queue when an all-bank PIM command 140 is broken down into multiple masked PIM commands 142.

In the illustrated example, the memory controller 122 includes a FIFO queue 1002 for all-bank PIM commands. The FIFO queue 1002 for all-bank PIM commands then drains into an out-of-order (OOO) queue 1004 for masked PIM commands. The dynamic PIM command scheduler 134 is enhanced with dependency tracking logic 1006 to track dependencies across instructions when an all-bank PIM command 140 is broken down into multiple masked PIM commands 142.

The illustrated FIFO queue 1002 includes two REFpb commands and six instructions labeled I1 through I6. The beginning of in-flight refresh commands is shown at 1008. I1 in the FIFO queue 1002 is split into two instructions—I1a and I1b in the OOO queue 1004. I2 in the FIFO queue 1002 is also split into two instructions I2a and I2b in the OOO queue 1004. The dependency tracking logic 1006 tracks the dependency between I1a and I1b as shown at 1010. The dependency tracking logic 1006 also tracks the dependency I2a and I2b as shown at 1012. The end of in-flight refresh commands is shown at 1014. At 1016, the dynamic PIM command scheduler 134 switches back to single bank commands for I3-I6 when no intervening commands exist.

Figure 11:
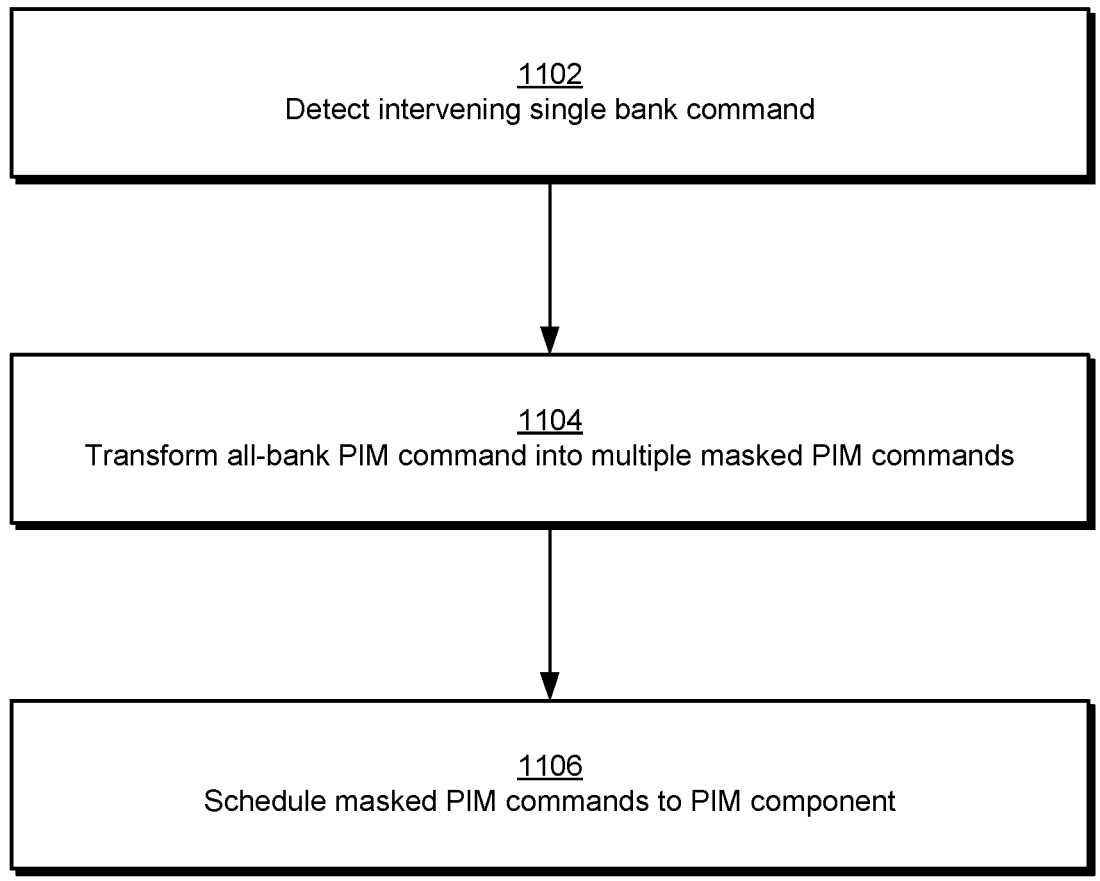
FIG. 11 depicts a method for transforming all-bank PIM commands into multiple masked PIM commands.

FIG. 11 depicts a method 1100 for transforming all-bank PIM commands 140 into multiple masked PIM commands 142. The method 1100 begins and proceeds to block 1102. At block 1102, the dynamic PIM command scheduler 134 detects an intervening single bank command, such as a per-bank refresh (REFpb) or a high-priority DRAM-only operation (e.g., a row activation). From block 1102, the method 1100 proceeds to block 1104.

At block 1104, the dynamic PIM command scheduler 134 transforms (shown generally as "transform 138" in FIG. 1) an all-bank PIM command 140 into multiple masked PIM commands 142. In some implementations, the multiple masked PIM commands 142 includes multiple masked multi-bank PIM commands that cause the PIM component 112 to execute multiple masked multi-bank PIM operations 148. In other implementations, the multiple masked PIM commands 142 includes one or more masked multi-bank PIM commands and one or more masked single bank PIM commands that cause the PIM component 112 to executed one or more masked multi-bank PIM operations 148 and one or more single masked PIM operations 150, respectively. From block 1104, the method 1100 proceeds to block 1106.

At block 1106, the dynamic PIM command scheduler 134 schedules the masked PIM commands 142 to the PIM component 142. In some implementations, the masked PIM commands 142 are the PIM scheduled requests 128A. In other implementations, the multiple masked PIM commands 142 are separate low-level commands scheduled to the PIM component 112 for executing corresponding masked PIM operations 146.

Figure 12:
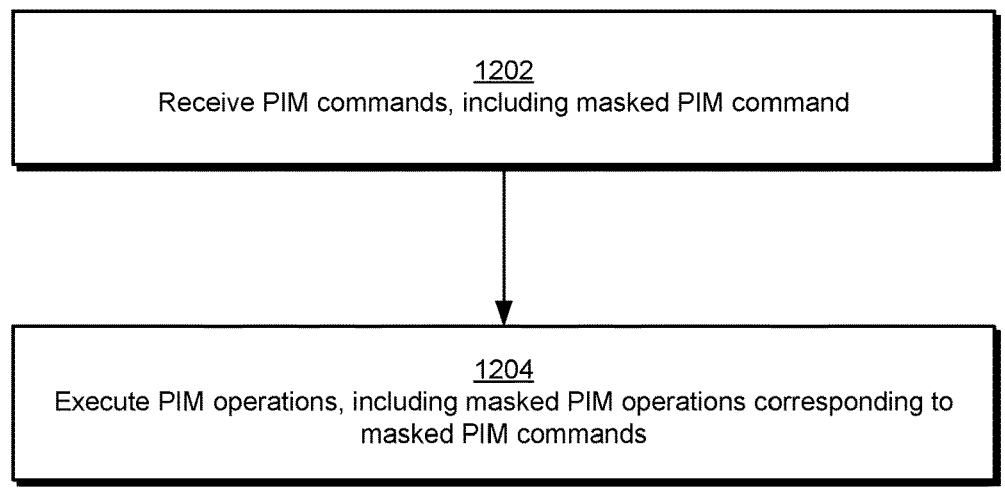
FIG. 12 depicts a method for executing masked PIM operations.

FIG. 12 depicts a method 1200 for executing masked PIM operations 146. The method 1200 begins and proceeds to block 1202. At block 1202, the PIM component 112 receives the PIM commands, including the masked PIM commands 142, from the dynamic PIM commands scheduler 134. From block 1202, the method 1200 proceeds to block 1204. At block 1204, the PIM component 112 executes PIM operations 116, including the masked PIM operations 146 corresponding to the masked PIM commands 142.

Figure 13:
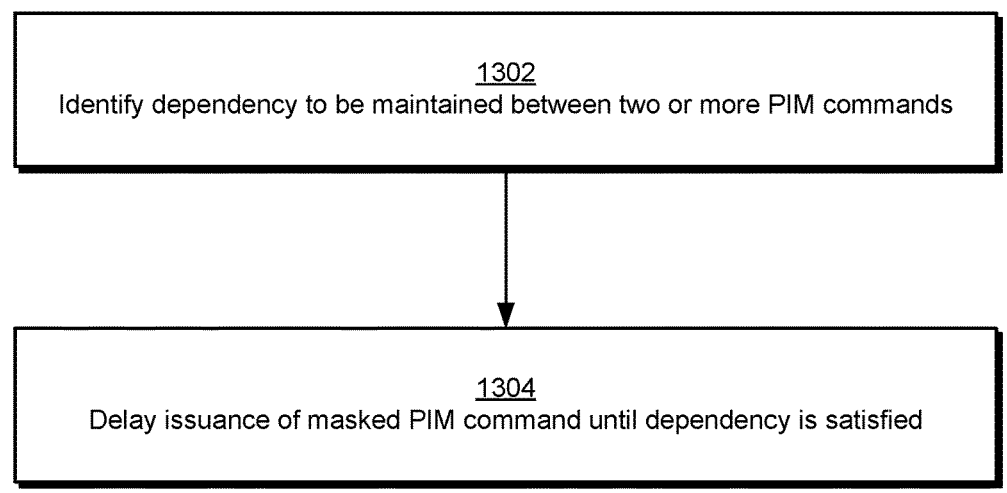
FIG. 13 depicts a method for preserving dependencies between PIM commands.

FIG. 13 depicts a method 1300 for preserving dependencies between PIM commands. The method 1300 begins and proceeds to block 1302. At block 1302, the dynamic PIM command scheduler 134 identifies a dependency is to be maintained between two or more PIM commands. From block 1302, the method 1300 proceeds to block 1304. At block 1304, the dynamic PIM command scheduler 134 delays issuance of a masked PIM command 142 until the dependency is satisfied.

Figure 14:
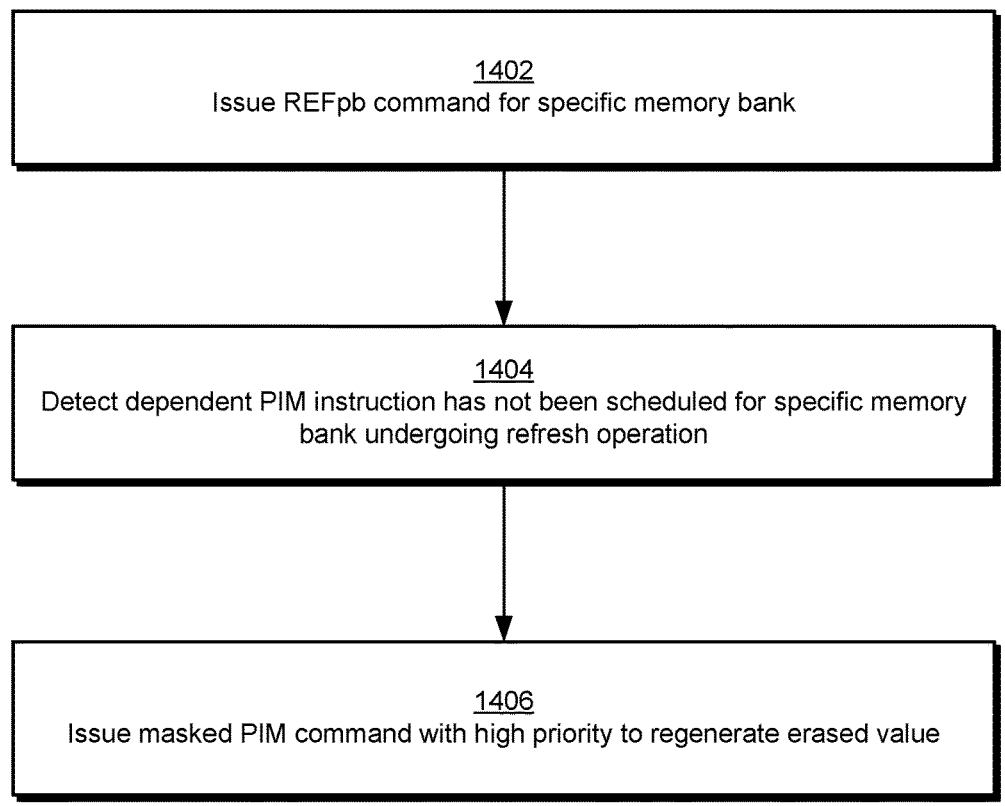
FIG. 14 depicts a method for addressing erasure of row buffer contents from refresh command scheduling.

FIG. 14 depicts a method 1400 for addressing erasure of row buffer contents from refresh command scheduling. The method 1400 begins and proceeds to block 1402. At block 1402, the dynamic PIM command scheduler 134 issues a REFpb command for a specific memory bank 208 of the memory 110. From block 1402, the method 1400 proceeds to block 1404. At block 1404, the dynamic PIM command scheduler 134 detects a dependent PIM instruction that has not been scheduled for the specific memory bank 208 that is undergoing a refresh operation responsive to the REFpb command. From block 1404, the method 1400 proceeds to block 1406. At block 1406, the dynamic PIM command scheduler 134 issues a masked PIM command 142 with high priority to regenerate the value erased as part of the refresh operation.

Figure 15:
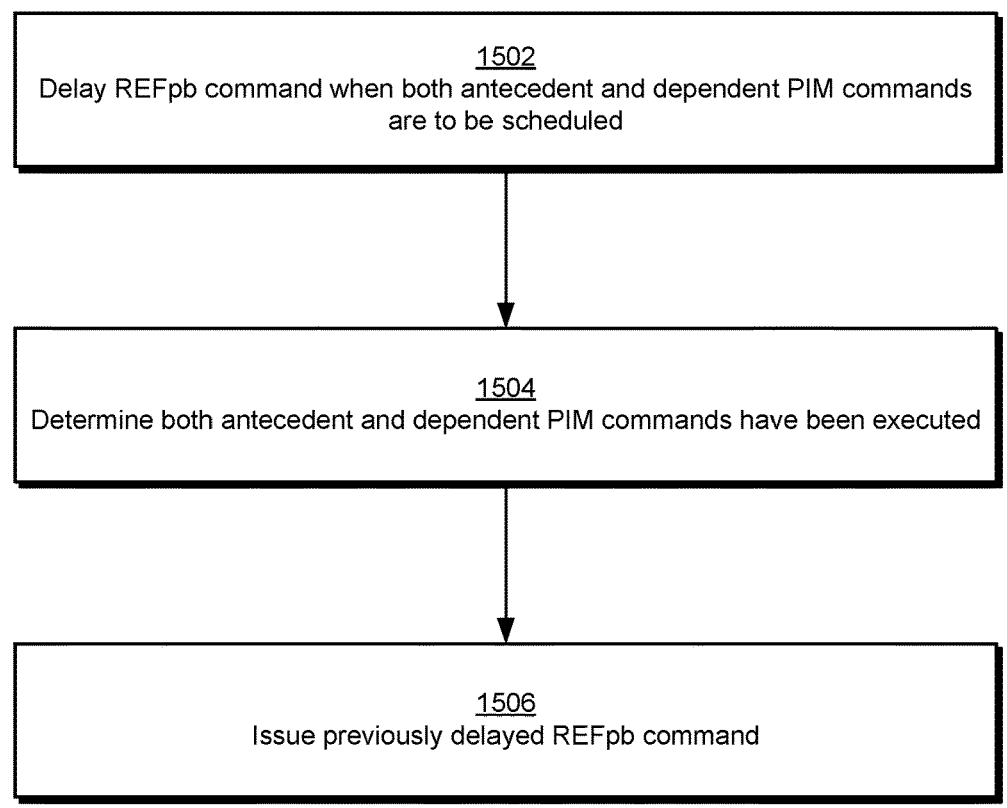
FIG. 15 depicts a method for delaying a REFpb command when existing antecedent and dependent commands are to be scheduled.

FIG. 15 depicts a method 1500 for delaying a REFpb command when existing antecedent and dependent commands are to be scheduled. The method 1500 begins and proceeds to block 1502. At block 1502, the dynamic PIM command scheduler 134 delays a REFpb command when both antecedent and dependent PIM commands are to be scheduled. From block 1502, the method 1500 proceeds to block 1504. At block 1504, the dynamic PIM command scheduler 134 determines that both the antecedent and dependent PIM commands have been executed. From block 1504, the method 1500 proceeds to block 1506. At block 1506, the dynamic PIM command scheduler 134 issues the previously delayed REFpb command.

Figure 16:
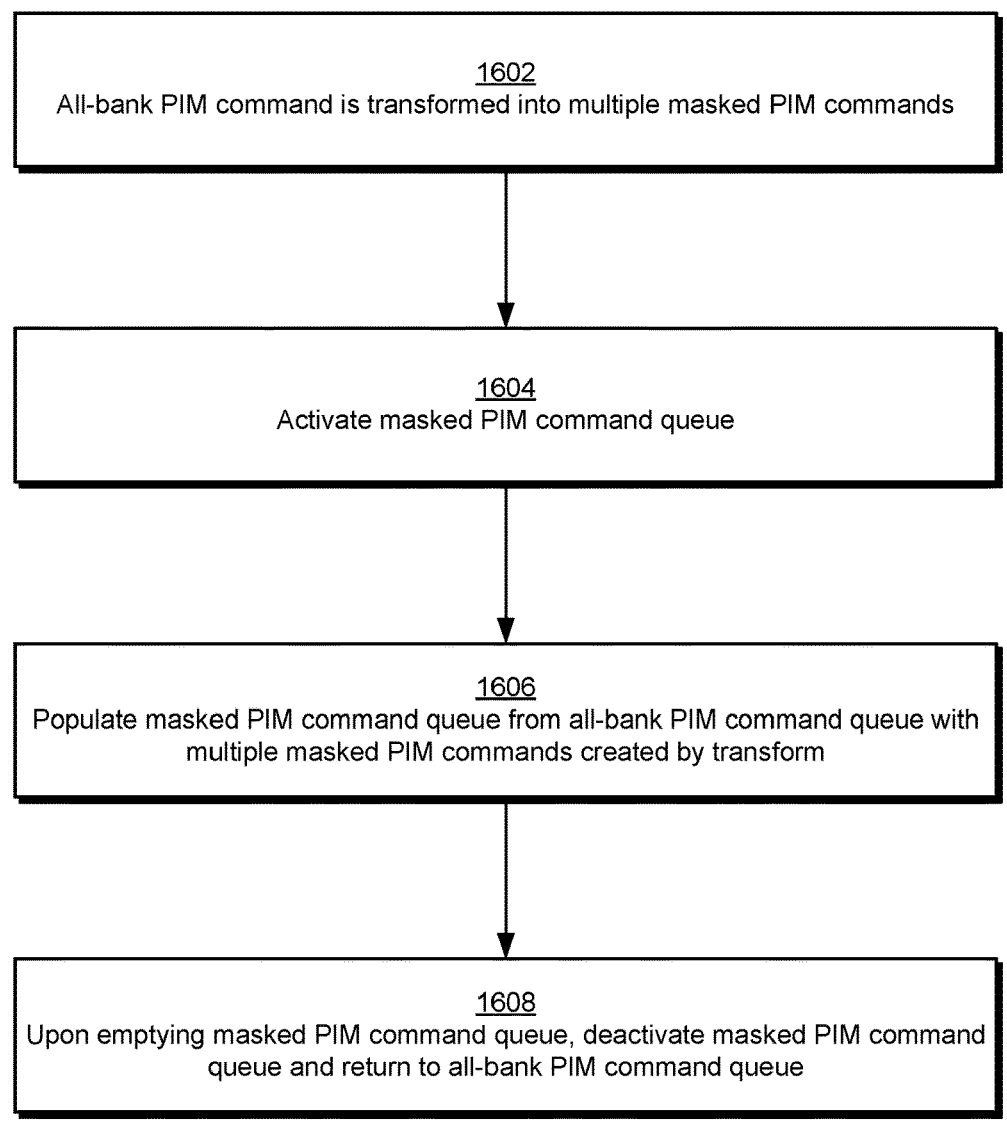
FIG. 16 depicts a method for maintaining dependencies across instructions.

FIG. 16 depicts a method 1600 for maintaining dependencies across instructions. The method 1600 begins and proceeds to block 1602. At block 1602, the dynamic PIM command scheduler 134 transforms an all-bank PIM command 140 into multiple masked PIM commands 142. From block 1602, the method 1600 proceeds to block 1604. At block 1604, the dynamic PIM command scheduler 134 activates a masked PIM command queue 1004 (also shown as the OOO queue 1004 in FIG. 10). From block 1604, the method 1600 proceeds to block 1606. At block 1606, the dynamic PIM command scheduler 134 populates the masked PIM command queue 1004 from an all-bank PIM command queue (also shown as the FIFO queue 1002 in FIG. 10). In particular, multiple masked PIM commands 142 created by the transform 138 are added from the all-bank PIM command queue 1002 to the masked PIM command queue 1004. From block 1606, the method 1600 proceeds to block 1608. At block 1608, upon emptying the masked PIM command queue 1004, the dynamic PIM command scheduler 134 deactivates the masked PIM command queue 1004 and returns to using the all-bank PIM command queue 1002. If another intervening command exists, the masked PIM command queue 1004 is re-activated.

In some implementations, the dynamic PIM command scheduler 134 autonomously decides not to transform an all-bank PIM command 140 into multiple masked PIM commands 142 under one or more conditions, such as due to pressure on the masked PIM command queue 1004 when the queue length hits a specific length and/or to meet a power budget for the memory controller 122.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102, the memory hardware 104, the interface 106, the core 108, the memory 110, the PIM component 112, the memory controller 122, the scheduling system 124, the dynamic PIM command scheduler 134, and the PIM transformation logic 136) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
a memory;
a processor-in-memory;
a host including at least one core; and
a memory controller configured to:
transform an all-bank processing-in-memory command into multiple masked processing-in-memory commands, the multiple masked processing-in-memory commands including at least one masked multi-bank processing-in-memory command; and
schedule the multiple masked processing-in-memory commands to the processor-in-memory.

2. The system of claim 1, wherein the memory controller is configured to detect an intervening per-bank command.

3. The system of claim 2, wherein the memory controller is configured to schedule the multiple masked processing-in-memory commands responsive to detecting the intervening per-bank command.

4. The system of claim 3, wherein the intervening per-bank command is a per-bank refresh command or a high priority command.

5. The system of claim 3, wherein the intervening per-bank command is a high priority command, the high priority command comprising a per-bank row activation command, a per-bank column access command, or a per-bank pre-charge command.

6. The system of claim 1, wherein the memory controller is configured to transform the all-bank processing-in-memory command into the multiple masked processing-in-memory commands based on one or more conditions.

7. The system of claim 1, wherein the memory controller is configured to maintain dependencies among the multiple masked processing-in-memory commands, wherein the multiple masked processing-in-memory commands include at least one of an additional masked multi-bank processing-in-memory command or a masked single bank processing-in-memory command.

8. The system of claim 1, wherein the memory controller is configured to delay a per-bank refresh command to avoid re-issuance of an antecedent processing-in-memory command in an antecedent-dependent pair with high priority.

9. The system of claim 1, wherein the memory comprises one of a dynamic random-access memory (DRAM), a synchronous DRAM (SDRAM), a high bandwidth memory (HBM), a ferroelectric RAM (FeRAM), a resistive RAM (RRAM), a spin-transfer torque magnetic RAM (STT-MRAM), or static RAM (SRAM).

10. A memory controller comprising:
a dynamic processing-in-memory command scheduler to:
transform an all-bank processing-in-memory command into multiple masked processing-in-memory commands, the multiple masked processing-in-memory commands including at least one masked multi-bank processing-in-memory command; and
schedule the multiple masked processing-in-memory commands to a processor-in-memory.

11. The memory controller of claim 10, wherein the dynamic processing-in-memory command scheduler detects an intervening per-bank command.

12. The memory controller of claim 11, wherein the dynamic processing-in-memory command scheduler schedules the multiple masked processing-in-memory commands responsive to detecting the intervening per-bank command.

13. The memory controller of claim 12, wherein the intervening per-bank command is a per-bank refresh command.

14. The memory controller of claim 12, wherein the intervening per-bank command is a high priority command.

15. The memory controller of claim 14, wherein the high priority command comprises a per-bank row activation command, a per-bank column access command, or a per-bank pre-charge command.

16. The memory controller of claim 11, wherein the dynamic processing-in-memory command scheduler maintains dependencies among the multiple masked processing-in-memory commands, wherein the multiple masked processing-in-memory commands include at least one of an additional masked multi-bank processing-in-memory command or a masked single bank processing-in-memory command.

17. The memory controller of claim 10, wherein the dynamic processing-in-memory command scheduler avoids re-issuance of an antecedent processing-in-memory command in an antecedent-dependent pair by delaying a per-bank refresh command.

18. A method comprising:
transforming, by a memory controller, an all-bank processing-in-memory command into multiple masked processing-in-memory commands, the multiple masked processing-in-memory commands including at least one masked multi-bank processing-in-memory command; and
scheduling, by the memory controller, the multiple masked processing-in-memory commands to a processor-in-memory.

19. The method of claim 18, further comprising:
detecting, by the memory controller, an intervening per-bank command; and
scheduling, by the memory controller, the multiple masked processing-in-memory commands responsive to detecting the intervening per-bank command.

20. The method of claim 19, further comprising:
maintaining dependencies among the multiple masked processing-in-memory commands, wherein the multiple masked processing-in-memory commands include at least one of an additional masked multi-bank processing-in-memory command or a masked single bank processing-in-memory command.

* * * * *